(12) United States Patent
Yogeeswaran

(10) Patent No.: US 9,130,393 B2
(45) Date of Patent: Sep. 8, 2015

(54) SYSTEMS AND METHODS TO ISOLATE LOWER AMPLITUDE SIGNALS FOR ANALYSIS IN THE PRESENCE OF LARGE AMPLITUDE TRANSIENTS

(75) Inventor: Karthik Yogeeswaran, Santa Monica, CA (US)

(73) Assignee: Belkin International, Inc., Playa Vista, CA (US)

( * ) Notice: Subject to any disclaimer, the term of this patent is extended or adjusted under 35 U.S.C. 154(b) by 720 days.

(21) Appl. No.: 13/444,520

(22) Filed: Apr. 11, 2012

(65) Prior Publication Data

US 2013/0080097 A1 Mar. 28, 2013

Related U.S. Application Data

(60) Provisional application No. 61/539,427, filed on Sep. 26, 2011, provisional application No. 61/578,638, filed on Dec. 21, 2011.

(51) Int. Cl.
*H02J 3/02* (2006.01)
*H04B 3/54* (2006.01)

(52) U.S. Cl.
CPC ... *H02J 3/02* (2013.01); *H04B 3/54* (2013.01); *H04B 2203/5416* (2013.01)

(58) Field of Classification Search
CPC ..................................................... G08B 21/00
USPC .......................................................... 702/66
See application file for complete search history.

(56) References Cited

U.S. PATENT DOCUMENTS

| | | | |
|---|---|---|---|
| 4,716,409 A | 12/1987 | Hart et al. | |
| 5,177,560 A * | 1/1993 | Stimple et al. | 356/308 |
| 5,229,753 A | 7/1993 | Berg et al. | |
| 5,233,342 A | 8/1993 | Yashiro et al. | |
| 5,268,666 A | 12/1993 | Michel et al. | |
| 5,428,342 A | 6/1995 | Enoki et al. | |
| 5,495,168 A * | 2/1996 | de Vries | 324/121 R |
| 5,600,310 A | 2/1997 | Whipple et al. | |
| 5,650,771 A | 7/1997 | Lee | |
| 5,699,276 A | 12/1997 | Roos | |
| 5,880,677 A | 3/1999 | Lestician | |
| 5,929,315 A * | 7/1999 | Dunegan | 73/1.82 |
| 6,137,283 A * | 10/2000 | Williams et al. | 324/76.12 |
| 6,147,484 A | 11/2000 | Smith | |
| 6,173,613 B1 * | 1/2001 | Dunegan | 73/587 |
| 6,320,968 B1 * | 11/2001 | Linder | 381/94.7 |

(Continued)

OTHER PUBLICATIONS

Michael K. Williams (A Discussion of Methods for Measuring Low-Amplitude Jitter, 1995).*

*Primary Examiner* — Sujoy Kundu
*Assistant Examiner* — Alvaro Fortich
(74) *Attorney, Agent, or Firm* — Byran Cave LLP

(57) ABSTRACT

Some embodiments concern a method of isolating low amplitude signals in one or more electrical signals. The method can include: using a data acquisition device to acquire one or more electrical signals; using a first processor to compute one or more first parameters related to the one or more electrical signals; using the first processor to determine one or more first portions of the one or more electrical signal that comprise one or more transient signals; using the first processor to selectively mask the one or more first portions of the one or more electrical signals to create one or more output signals; and adjusting a gain of the data acquisition device based upon one or more second parameters of the one or more output signals. Other embodiments are disclosed.

20 Claims, 10 Drawing Sheets

(56) References Cited

U.S. PATENT DOCUMENTS

| | | | |
|---|---|---|---|
| 6,418,083 B1* | 7/2002 | Wagstaff et al. | 367/135 |
| 6,420,969 B1 | 7/2002 | Campbell | |
| 6,678,209 B1* | 1/2004 | Peng et al. | 367/95 |
| 6,906,617 B1 | 6/2005 | Van der Meulen | |
| 7,728,986 B2* | 6/2010 | Lasker et al. | 356/497 |
| 7,982,596 B2 | 7/2011 | Curt et al. | |
| 8,094,034 B2* | 1/2012 | Patel et al. | 340/657 |
| 8,325,817 B2 | 12/2012 | Iwami et al. | |
| 8,712,732 B2 | 4/2014 | Patel et al. | |
| 8,924,604 B2* | 12/2014 | Yogeeswaran et al. | 710/18 |
| 2003/0112370 A1 | 6/2003 | Long et al. | |
| 2004/0027138 A1* | 2/2004 | Pickerd et al. | 324/646 |
| 2007/0014369 A1 | 1/2007 | Santhoff et al. | |
| 2007/0067003 A1* | 3/2007 | Sanchez et al. | 607/45 |
| 2007/0152864 A1* | 7/2007 | Pease | 341/155 |
| 2007/0237441 A1* | 10/2007 | Roussell et al. | 385/1 |
| 2008/0234983 A1* | 9/2008 | Leigh et al. | 702/190 |
| 2010/0280392 A1* | 11/2010 | Liu et al. | 600/475 |
| 2011/0098949 A1* | 4/2011 | Vennelakanti et al. | 702/56 |
| 2011/0194705 A1* | 8/2011 | Gautama | 381/59 |
| 2011/0249181 A1 | 10/2011 | Iwami et al. | |
| 2013/0179124 A1 | 7/2013 | Patel et al. | |

* cited by examiner

200

300

400

700

US 9,130,393 B2

SYSTEMS AND METHODS TO ISOLATE LOWER AMPLITUDE SIGNALS FOR ANALYSIS IN THE PRESENCE OF LARGE AMPLITUDE TRANSIENTS

CROSS-REFERENCE TO RELATED APPLICATIONS

This application claims the benefit of U.S. Provisional Application No. 61/539,427, filed Sep. 26, 2011, and U.S. Provisional Application No. 61/578,638, filed Dec. 21, 2011. U.S. Provisional Application Nos. 61/539,427 and 61/578,638 are incorporated herein by reference.

FIELD OF THE INVENTION

This invention relates generally to electrical devices, and relates more particularly to signal processing systems and methods.

DESCRIPTION OF THE BACKGROUND

The dynamic range of a system can be defined as the ratio of a specified maximum level of a parameter, such as power, current, voltage, or frequency, to the minimum measurable value of that parameter.

In a signal processing system, this dynamic range can be determined by: (1) analog front end hardware (e.g., the noise figure of the amplification, bandwidth, clip level etc. of the amplifiers, filters and other front end circuit components; and/or ADC (analog-to-digital converter) (e.g., the number of bits, SINAD, reference voltages etc. for the ADC). If a signal is sent into the hardware with a level greater than the maximum input level of the amplifiers or the reference maximum levels of the ADC, the digitized signal will show clipping, wrapping, or both, all of which are unfavorable. Higher dynamic range can be achieved by utilizing higher quality amplifiers and ADCs, etc., but ADCs with more bits of resolution come at a higher cost.

Another mechanism to mitigate the clipping and wrapping effects is to employ what is called a compandor, which uses a non-linear transfer function to dynamically scale the amplitude of input signals to avoid the input signal from approaching the extremes of the dynamic range. The compandor, however, cannot be used in certain applications because it distorts the response of the signals being measured with its non-linear function.

Digital spectrum analyzers work by sampling an input voltage (which may be down converted using various mixing techniques) at a particular rate using an ADC (typically, 16-bit). The digitized data can be converted to the frequency domain using a Fourier transform. To measure lower amplitude signals, the reference level of the spectrum analyzer is adjusted, and thus, the amplifier gain is changed. The maximum level that can be measured at this reference level setting is determined by the bit resolution of the ADC. If during the sampling period a signal with amplitude larger than the maximum level was received even for a brief instant, the Fourier transform calculated will be heavily distorted.

A practical application where this type of limitation can be seen is in the continuous noise based disaggregation methods. In some examples, the continuous noise based disaggregation method can focus on switch mode power supply based loads and utilizes the changes in the high frequency spectrum (e.g., 10 kHz (kilohertz)-500 kHz) due to the addition or removal of high frequency artifacts, which occur in every cycle (continuous). Triac based loads (such as dimmers) and other loads can produce very large broadband transients multiple times during each AC (alternating current) cycle as they abruptly turn on/off at a preset voltage. These transients can be 20-50 dB (decibels) larger than the signals of interest from switching supplies.

Accordingly, a need or potential for benefit exists for a device or method that can isolate weak signals in the presence of large amplitude signals.

BRIEF DESCRIPTION OF THE DRAWINGS

To facilitate further description of the embodiments, the following drawings are provided in which.

Figure 1:
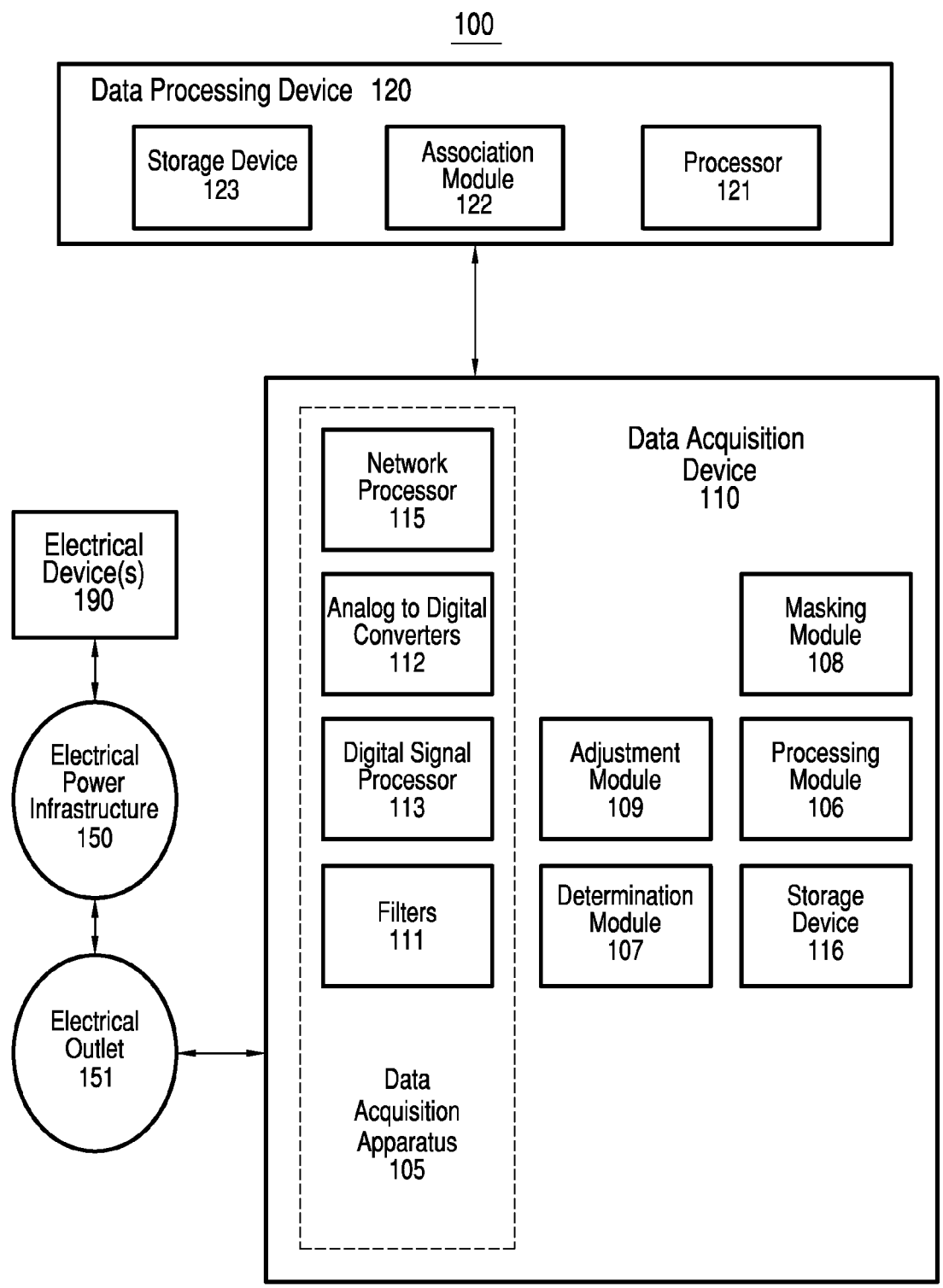
FIG. 1 illustrates a diagram of an exemplary signal processing system, according to a first embodiment.

For simplicity and clarity of illustration, the drawing figures illustrate the general manner of construction, and descriptions and details of well-known features and techniques may be omitted to avoid unnecessarily obscuring the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein.

The terms "couple," "coupled," "couples," "coupling," and the like should be broadly understood and refer to connecting two or more elements or signals, electrically, mechanically and/or otherwise. Two or more electrical elements may be electrically coupled but not be mechanically or otherwise coupled; two or more mechanical elements may be mechanically coupled, but not be electrically or otherwise coupled; two or more electrical elements may be mechanically coupled, but not be electrically or otherwise coupled. Coupling may be for any length of time, e.g., permanent or semi-permanent or only for an instant.

"Electrical coupling" and the like should be broadly understood and include coupling involving any electrical signal, whether a power signal, a data signal, and/or other types or combinations of electrical signals. "Mechanical coupling" and the like should be broadly understood and include mechanical coupling of all types.

The absence of the word "removably," "removable," and the like near the word "coupled," and the like does not mean that the coupling, etc. in question is or is not removable.

DETAILED DESCRIPTION OF EXAMPLES OF EMBODIMENTS

Some embodiments concern a method of isolating low amplitude signals in one or more electrical signals. The method can include: using a data acquisition device to acquire one or more electrical signals, the one or more electrical signals comprise one or more transient signals and one or more first signals, and amplitudes of the one or more first signals are less than amplitudes of the one or more transient signals; using a first processor to compute one or more first parameters related to the one or more electrical signals, wherein: using the first processor to compute the one or more first parameters can include: determining a median amplitude of the one or more electrical signals; and determining a median slope of the one or more electrical signals; using the first processor to determine one or more first portions of the one or more electrical signal that comprise the one or more transient signals, wherein: determining the one or more first portions can include: using the first processor to determine one or more first portions of the one or more electrical signals where at least one of the following is true: an amplitude of the one or more first portions of the one or more electrical signals is greater than the median amplitude of the one or more electrical signals by a first predetermined amount; or a slope of the one or more first portions of the one or more electrical signals is greater than the median slope of the one or more electrical signals by a second predetermined amount; using the first processor to selectively mask the one or more first portions of the one or more electrical signals to create one or more output signals; and adjusting a gain of the data acquisition device based upon one or more second parameters of the one or more output signals. The one or more first portions of the one or more electrical signals comprise the one or more transient signals.

Various embodiments teach a signal processing device configured to isolate low amplitude signals in one or more electrical signals. The signal processing device can have a first processor. The signal processing device can include: (a) a data acquisition apparatus configured to acquire one or more electrical signals, the one or more electrical signals comprise one or more transient signals and one or more first signals, amplitudes of the one or more first signals are less than amplitudes of the one or more transient signals; (b) a processing module configured to run on a first processor to (1) calculate a median amplitude of the one or more electrical signals; and (2) calculate a median slope of the one or more electrical signals; (c) a determination module configured to run on the first processor and further configured to determine one or more first portions of the one or more electrical signal that comprise the one or more transient signals, the determination module is further configured to determine one or more first portions of the one or more electrical signals where at least one of the following is true: an amplitude of the one or more first portions of the one or more electrical signals is greater than the median amplitude of the one or more electrical signals by a first predetermined amount; or a slope of the one or more first portions of the one or more electrical signals is greater than the median slope of the one or more electrical signals by a second predetermined amount; (d) a masking module configured to run on the first processor and further configured to selectively mask the one or more first portions of the one or more electrical signals to create one or more output signals; and (e) an adjustment module configured to adjust a gain of the data acquisition apparatus based upon one or more second parameters of the one or more output signals. The one or more first portions of the one or more electrical signals comprise the one or more transient signals.

Additional embodiment can disclose a method of isolating low amplitude signals in one or more electrical signals. The method can include: using a data acquisition device to acquire one or more electrical signals, the one or more electrical signals comprise one or more transient signals and one or more first signals, amplitudes of the one or more first signals are less than amplitudes of the one or more transient signals; using a first processor to compute one or more first parameters related to the one or more electrical signals, wherein: using the first processor to compute the one or more first parameters can include: determining a median amplitude of the one or more electrical signals; and determining a median slope of the one or more electrical signals; using the first processor to determine one or more first portions of the one or more electrical signal that comprise the one or more transient signals, determining the one or more first portions comprises: using the first processor to determine one or more first portions of the one or more electrical signals where at least one of the following is true: an amplitude of the one or more first portions of the one or more electrical signals is greater than the median amplitude of the one or more electrical signals by a first predetermined amount; or a slope of the one or more first portions of the one or more electrical signals is greater than the median slope of the one or more electrical signals by a second predetermined amount; using the first processor to selectively mask the one or more first portions of the one or more electrical signals to create one or more output signals; adjusting a gain of the data acquisition device based upon one or more second parameters of the one or more output signals, wherein: adjusting the gain can include: determining a median amplitude of the one or more output signals; and adjusting the gain by a predetermined amount related to the median amplitude of the one or more output signals. Embodiments described herein provide a method to isolate weak signals in the presence of large amplitude signals. The same or different embodiments also provide a method to track the location of the transients within the time domain data.

Now turning to the drawings, FIG. 1 illustrates a diagram of an exemplary signal processing system 100, according to a first embodiment. In some embodiments, signal processing system 100 can be configured to isolate low amplitude signals in one or more data or electrical signals. Signal processing system 100 is merely exemplary and is not limited to the embodiments presented herein. Signal processing system 100 can be employed in many different embodiments or examples not specifically depicted or described herein.

Referring to FIG. 1, signal processing system 100 can include: (a) at least one data acquisition device 110 configured to be coupled to at least one electrical outlet 151 of electrical power line infrastructure 150 (i.e., the electrical power lines in the structure); and (b) at least data processing device 120. In some embodiment, signal processing system 100 does not include electrical power line infrastructure 150, electrical outlet 151, or electrical appliances 190. In a different embodiment, signal processing system 100 also does not include data processing device 120. In some examples, signal processing system 100 includes association module 122 (FIG. 2) but not data processing device 120.

In various embodiments, data acquisition device 110 can include: (a) data acquisition apparatus 105; (b) a processing module 106; (c) a determination module 107; (d) a masking module 108; (e) an adjustment module 109; and (f) a storage device 116. Data processing device 120 can include: (a) at least one processor 121; (b) an association module 122; and (c) a storage device 123.

Data acquisition apparatus 105 can be configured to acquire one or more electrical signals. Data acquisition apparatus can include (a) one or more filters 111; (b) an analog to digital converter 112; (c) at least one digital signal processor 113; and (e) a network processor 115

The one or more electrical signals include one or more transients signals and one or more data signals. The amplitudes of data signals are less than amplitudes of the transient signals. In various embodiments, the transient signals are caused by actuation of electrical appliances 190.

In some examples, filters 111 can include a high pass and a low pass filter. In some examples, the band pass filter can be configured to pass electrical signals in the range of 10 kHz to 1 MHz. The low pass filer can be configured, e.g., to pass electrical signals in the range of zero hertz to 1 kHz. Filters 111 can pass one or more filtered electrical signals to analog to digital converter 112. Analog to digital converter 112 can be configured to convert the filtered electrical signals into digital signals. In the same or different examples, filters 111 include a bandpass filter, which isolates the signals between 10 kHz and 1 MHz (megahertz) and is connected to electrical power line infrastructure 150 via electrical outlet 151.

In some examples, digital signal processor 113 can be configured to receive the digitized low pass filtered signal from analog to digital converter 112. Digital signal processor 113 can also be configured determine the zero crossing point of the electrical signal and calculate an electrical power of one or more signals on the electrical power line infrastructure 150. Digital signal processor 113 can be configured to communicate the zero crossing and power to digital signal processor 113. In one example, digital signal processor 113 can be a TI C6748 processor, manufactured by Texas Instruments, Inc. of Dallas, Tex.

Network processor 115 can receive information and/or data from digital signal processor 113 can communicate the information and/or data to data processing device 120 via one or more data networks (e.g., the Internet).

Processing module 106 can be configured to run on digital signal processor 113 and further configured to calculate a median amplitude of the one or more electrical signals and calculate a median slope of the one or more electrical signals.

Determination module 107 can be configured to run on digital signal processor 113 and further configured to determine one or more first portions of the one or more electrical signal that comprise the one or more transient signals. Determination module 107 can be further configured to determine one or more first portions of the one or more electrical signals where at least one of the following is true: an amplitude is greater than the median amplitude by a first predetermined amount; or a slope is greater than the median slope by a second predetermined amount. Determination module 107 can be further configured to determine a median amplitude of the one or more output signals.

Masking module 108 can be configured to run on digital signal processor 113 and further configured to selectively mask the one or more first portions of the one or more electrical signals to create one or more output signals. Masking module 108 can be further configured to use digital signal processor 113 to apply a linear interpolation technique to selectively mask the one or more first portions of the one or more electrical signals. In the same or different embodiments, masking module 108 can be further configured to apply an inverted window function to selectively mask the one or more first portions of the one or more electrical signals.

Adjustment module 109 can be configured to run on digital signal processor 113 and further configured to adjust a gain of the data acquisition apparatus 105 based upon one or more second parameters of the one or more output signals. That is, in some examples, adjustment module 109 is further configured to adjust the gain of the data acquisition device such that the median amplitude of the one or more signals is a predetermined percentage of the maximum gain range of the data acquisition device.

Storage device 116 is configured to store one or more locations of the one or more first portions of the one or more electrical signals.

A "data processing device," as used herein, can refer to a single computer, single server, or a cluster or collection of servers. Typically, a cluster or collection of servers can be used when the demands by client computers (e.g., one or more data acquisition devices) are beyond the reasonable capability of a single server or computer. In many embodiments, the servers in the cluster or collection of servers are interchangeable from the perspective of the client computers.

Association module 122 can be configured to run on processor 121 and further configured to associate the one or more first portions of the one or more electrical signals with usage of the electrical power by one or more first electrical appliances.

Figure 2:
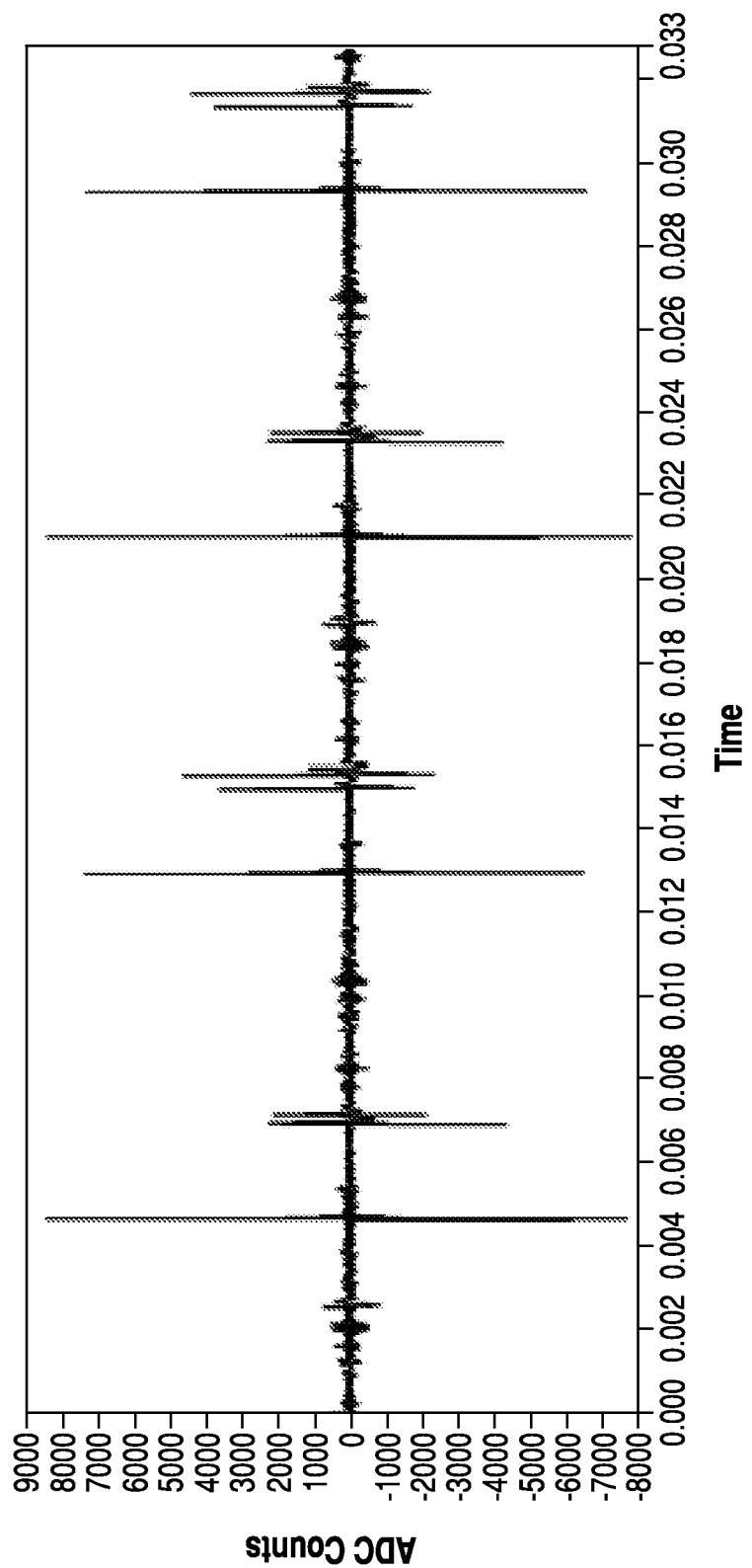
FIG. 2 illustrates a graph that shows data collected using the data acquisition device of FIG. 1.

FIG. 2 illustrates a graph 200 that shows 33 ms (milliseconds) of data collected using the data acquisition device 110. In FIG. 2, the x-axis for the plot is time in seconds (two AC cycles worth) and the y-axis is in ADC counts. The four large spikes in the data are caused by a dimmer, which is connected to a bulb in the home. The transient signals are caused when the triac in the dimmer abruptly turns on the light bulb when reaching a certain voltage. The four smaller spike pairs in the data are from switch mode power supplies, which have diode rectifier circuits, which turn on/off when the AC line voltage crosses the capacitor voltage.

The signals of interest are the remaining signals not including transient signals just described which are the switching supply switching frequency signals.

Figure 3:
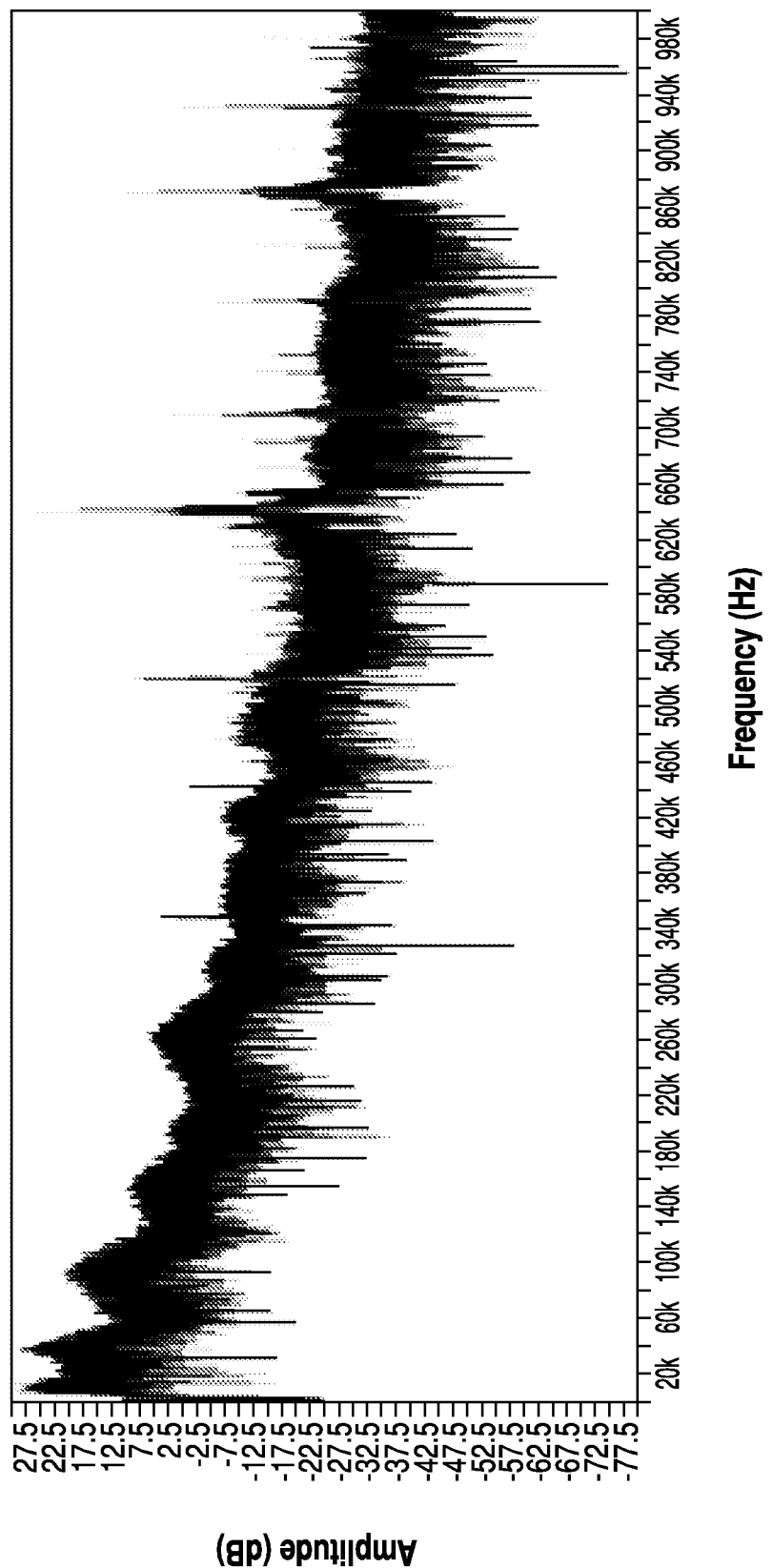
FIG. 3 illustrates a graph of the data of FIG. 2 after applying a windowed fast Fourier transform.

Taking a windowed FFT (fast Fourier transform) over the length of the AC cycle (16.6 ms) yields a graph 300 shown in FIG. 3. As can be seen, the spectrum is very wide in bandwidth. This shows that it is dominated by the broadband noise of the spikes (transients/glitches) described earlier.

This is not ideal as the switching frequencies of the switching supplies, which are to be targeted, are masked by the broadband high-energy spectrum of the transients/glitches/spikes. The same data is replotted in FIG. 4 using a short time Fourier transform (STFT) (4096 point Blackman Harris window/8192 point FFTs/64 point step size).

Figure 4:
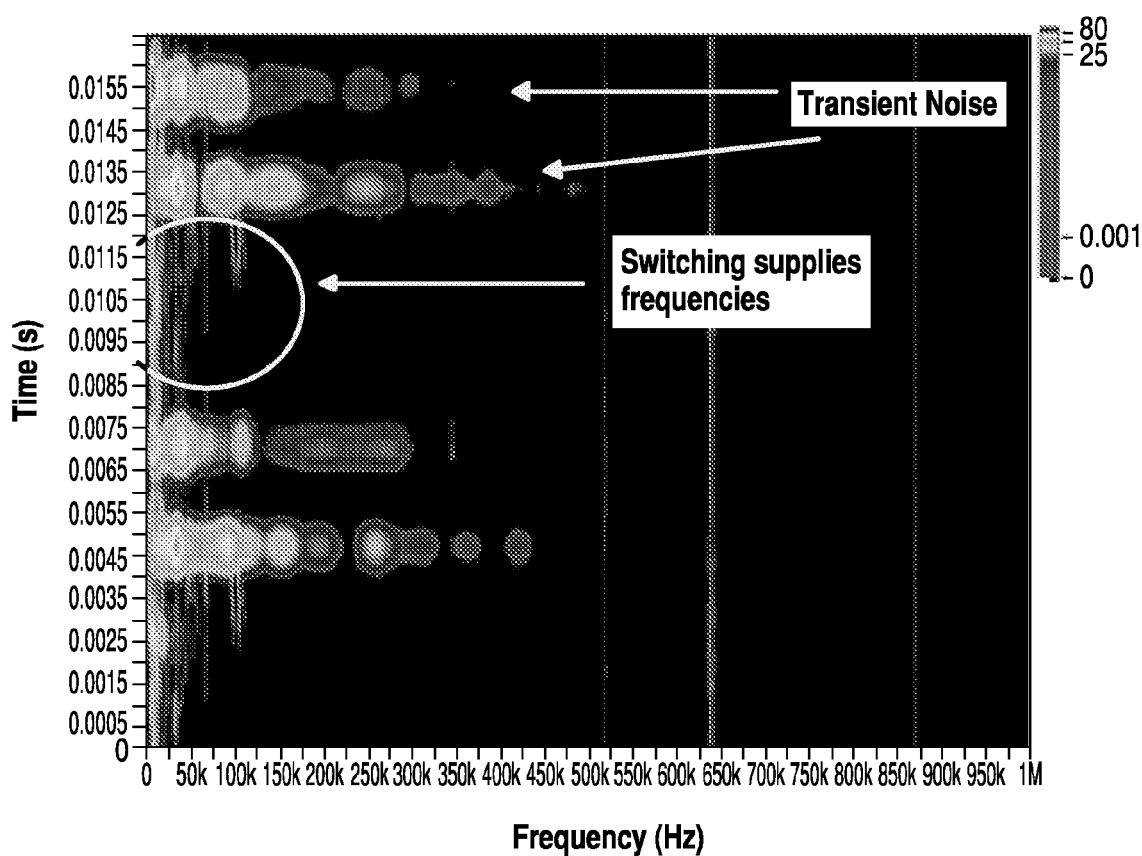
FIG. 4 illustrates a graph of the data of FIG. 2 after applying a short time Fourier transform.

As can be seen in FIG. 4, the large amplitude transients produce broadband spectra mainly at 4 points in time in the AC cycle in the above example. These are shown to be 0.0155 s (seconds), 0.013 s, 0.007 s and 0.0048 s. A simple solution to isolate the signals of interest would be to merely use a small subset of this data for further analysis. In this example that would be around 0.0115 s. This however would not be a good solution for the following reasons: (1) it would require a very narrow window function and therefore a limited data length; (2) the location of the transients vary from AC cycle to AC cycle and so predicatively choosing a proper location would be difficult; and (3) there may be a case where you have numerous transients within the captured data so the length of data set that is devoid of a transient is too small to be usable for any proper analysis.

Figure 5:
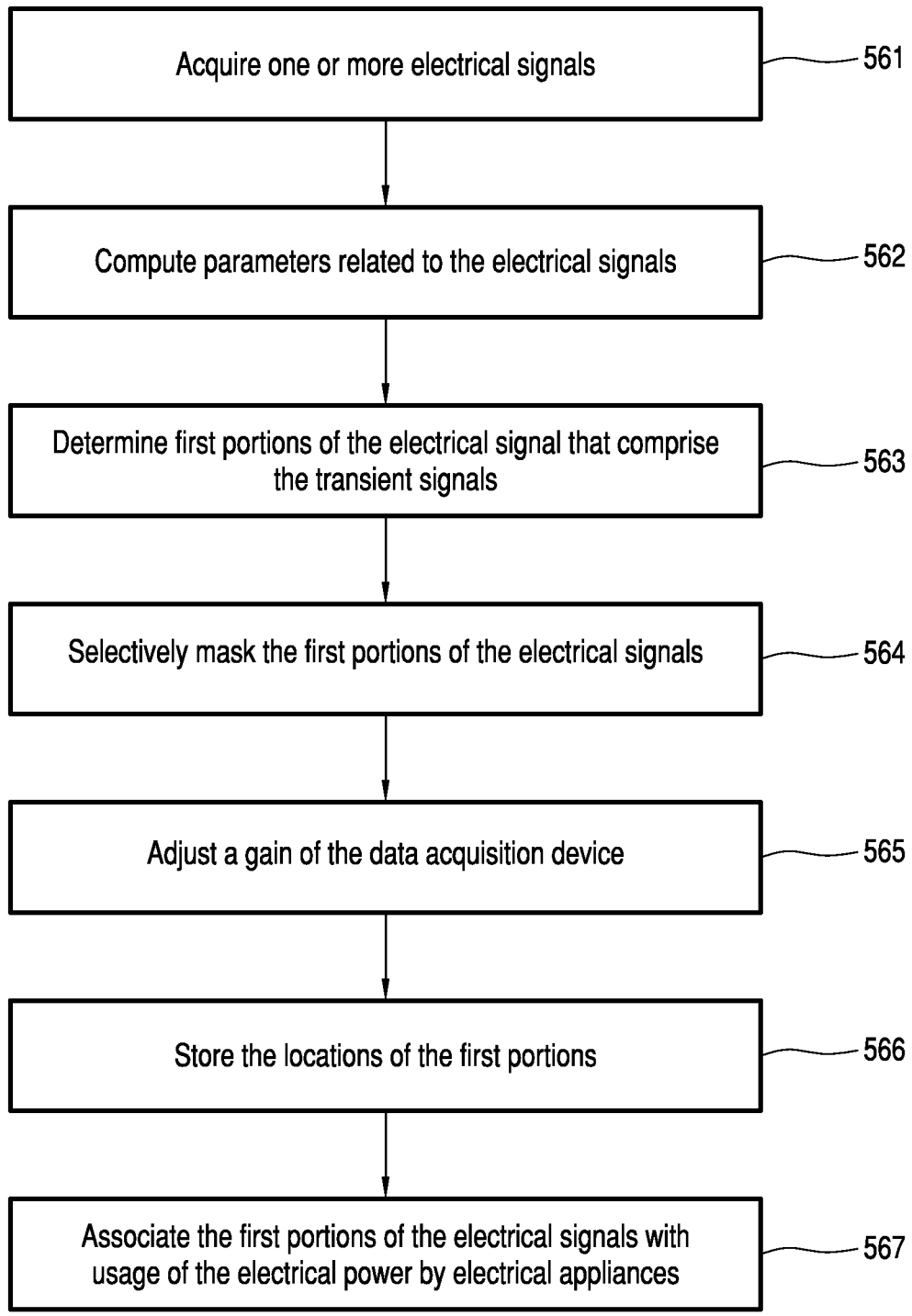
FIG. 5 illustrates a flow chart for an embodiment of a method of isolating low amplitude signals in one or more electrical signals.

FIG. 5 illustrates a flow chart for an embodiment of a method 500 of isolating low amplitude signals in one or more electrical signals. Method 500 is merely exemplary and is not limited to the embodiments presented herein. Method 500 can be employed in many different embodiments or examples not specifically depicted or described herein. In some embodiments, the activities, the procedures, and/or the processes of method 500 can be performed in the order presented. In other embodiments, the activities, the procedures, and/or the processes of method 500 can be performed in any other suitable order. In still other embodiments, one or more of the activities, the procedures, and/or the processes in method 500 can be combined or skipped.

Referring to FIG. 5, method 500 in FIG. 5 includes an activity 561 of acquiring one or more electrical or data signals. In some examples, acquiring the electrical signal can include using a data acquisition device to acquire one or more electrical signals. The electrical signals can include one or more transients signals and one or more first signals. The amplitudes of the first signals are less than amplitudes of the transient signals. In some examples, the amplitudes of the first signals are three, four, ten, fifty, or hundred times less than amplitudes of the transient signals. In some examples, the transient signals and/or the first signals are caused by actuation of one or more first electrical appliances. In some examples, the data acquisition device can be similar or the same as data acquisition apparatus 105 of FIG. 1.

Subsequently, method 500 of FIG. 5 includes an activity 562 of computing parameters related to the electrical signals. In some examples, computing the parameter can include using a first processor (e.g., digital signal processor 113 (FIG. 1)) to compute one or more first parameters related to the electrical signals. For examples, computing the parameter can involve: (a) determining a median amplitude of the one or more electrical signals; and (b) determining a median slope of the one or more electrical signals.

In some embodiments, the algorithm goes through the input data (e.g., the electrical signals) and determines the typical (median) amplitude and typical (median) slope. In one embodiment, activity 562 can include: (a) an input waveform (e.g., the electrical signals) is stored as array R; and (b) finding the slope at every point in the array R; (c) determine the median sample computation duration 'MSCD'. This calculation is done by determining the length of the slowest frequency component of interest in samples. If the sample rate was 2 MSPS and the slowest frequency component of interest was 10 kHz then the length of the median computation duration MSCD=200 samples. In some situations, the signal of interest may be only present in a portion of the full data (In the case of the switching frequency content it is only present at the peak points in the AC cycle). If to compute the median based only on the portion of the cycle with the signals of interest, isolate a section of the data and compute the median only for that portion. To do this, determine the start point 'start' for the analysis and length 'len' for the analysis; (d) calculate the number of MSCD bins 'num' to compute from 'len' and 'MSCD' where num=floor (len/MSCD) (i.e., round down); (e) for each MSCD bin determine the maximum amplitude and maximum slope; and (f) compute the median for these max values. The medians represent the typical maximum amplitude (Med_SAM) for the signal of interest and the typical maximum slope (Med_SDM) of the signal.

Next, method 500 of FIG. 5 includes an activity 563 of determining first portions of the electrical signal that comprise the transient signals. In some examples, determining the first portions can include using the first processor (e.g., digital signal processor 113 (FIG. 1)) to determine one or more first portions of the electrical signal that comprise the transient signals. In some examples, determining the one or more first portions can involve using the first processor to determine one or more first portions of the one or more electrical signals where at least one of the following is true: (1) an amplitude is greater than the median amplitude by a first predetermined amount; or (2) a slope is greater than the median slope by a second predetermined amount.

For examples, determination module 107 (FIG. 1) can determine portions of the input data are transients/glitches/spikes based on those parameters; Determination module 107 (FIG. 1) can search the data (i.e., the electrical signals) for any instances where the data exceeds the H times median slope or T times the median amplitude. These points in the data represent the locations for transients. Determination module 107 (FIG. 1) can group the flagged regions together to represent individual transients. H and T can be predetermined numbers (e.g., two, three, four or five.) In some examples. In other examples, H and T can be scaled dynamically base on the values of Med_SAM and Med_SDM.

In various examples, activity 563 can include: (a) go through the full A and D arrays and find all the points that are H times worse than the median slope or T times the median amplitude or greater than 90% of the ADC full scale range ADC_FULLSCALE. Typical values for H and T are three, four, five, or ten; (b) as each transient will have multiple points that fit the criteria determination module 107 (FIG. 1) can groups the flag indices into blocks to represent the areas to be masked. For this example, the maximum transient length was determined to be 500 samples, the minimum transient length was set to 200, and the longest expected distance between two sequential flags within the same transient is 100. These numbers should be adjusted depending on the application and sample rate; (c) the locations of the start index of the transients in sample counts is represented by the array start [ ]. This is output to the array transient_locations.

Method 500 in FIG. 5 continues with an activity 564 of selectively masking the first portions of the electrical signals. In some examples, selectively masking the first portion can include using the first processor (e.g., digital signal processor 113 (FIG. 1)) to selectively mask the one or more first portions of the electrical signals to create one or more output signals. The first portions of the one or more electrical signals comprise the one or more transient signals. In some examples, masking module 108 can perform at least part of activity 564.

In one example, a linear interpolation technique can be applied to selectively mask the one or more first portions of the one or more electrical signals. In another example, an inverted window function can be applied to selectively mask the one or more first portions of the one or more electrical signals.

In some examples, activity 564 can include selectively masking out the transients/glitches/spikes in the data (e.g., the electrical signals) in such a way as to not distort further analysis. The processes of activity 564 mask the section of the data around the located transients. In one example, activity 564 uses an interpolation technique to bridge the data on either side of the transient. The algorithm can extend the length of the masked region to reduce the slope of the interpolated data as close to 0 as possible without masking too much of the desired signal as the closer the masked region slope approaches zero the lower the impact on any later analysis performed on the data. Other embodiments can mask the transient by the use of an inverted window function whose width is adjusted to the width of the transient to be masked.

In various embodiments, activity 564 can include using the linear interpolation method to masking the data. In some embodiments, this process can involve using a function that stores an array representing a the separate rising edge and falling edge of a window function (such as Blackman-Harris) and then multiplying the falling edge against the samples of array R immediately preceding a mask region and then multiplying the rising edge against the samples of array R immediately following a mask region. The mask region would be replaced with an array of equal length of 0s.

The first process for the linear interpolation masking method is to extend the mask regions so that the interpolated slope has little impact on the analyzed data. This is done by checking the masks to find out if start and stop points are within +/−⅓rd of the median max amplitude ADC counts. If not the mask is extended in either direction (up to a max of 100 points) till the amplitude is less than +/−(⅓)* Med_SAM.

The second process in the linear interpolation masking method would be to calculate the interpolation slope and replace the transient data with the interpolated data.

After applying the liner interpolation, activity 564 can include applying a function to the Med_SAM number to filter it with previous readings to smooth out the value. For this function, an exponential moving average function will be used but other functions can also be used. In this example, we will use a 60 point exponential moving average.

Subsequently, method 500 of FIG. 5 includes an activity 565 of adjusting a gain of the data acquisition device. In some examples, adjusting the gain can include using the first processor (e.g., digital signal processor 113 (FIG. 1)) to compute one or more second parameters related to the one or more output signals. For examples, activity 565 can involve determining a median amplitude of the one or more output signals and adjusting the gain of the data acquisition device such that the medium amplitude of the one or more signals is a predetermined percentage of the maximum gain range of the data acquisition device. In various embodiments, adjustment module 109 (FIG. 1) can at least partially perform activity 565.

Adjust the gain of data acquisition apparatus 105 (FIG. 1) can maximize use of the dynamic range based on the computed parameters on the signals of interest. Once this algorithm is applied, the gain of (e.g., digital signal processor 113 (FIG. 1)) can be adjusted such that the median amplitude for the desired signal (Med_SAM) equals some percentage Q (for example 75%) of the ADC full scale range. This maximizes the usage of the available dynamic range.

In various embodiments, activity 565 can include: (a) adjustment module 109 (FIG. 1) defines a function 'gain', which sets the gain in 2B increments from 0 dB to 60 dB gain (31 steps) with ADC_FULLSCALE=ADC range which for a 16 bit ADC=65536 (we are using a data acquisition apparatus with a VGA with 60 dB of settable gain values). Q is the desired percentage of ADC full scale range to be occupied by the desired signal. In this embodiment, Q can equal 75% of the maximum gain; (b) adjustment module 109 (FIG. 1) can computes the maximum value in an array subset and compare the maximum value to Q; (c) computes the median value for an array; and (d) adjust the gain. This method can be modified based on the design of the data acquisition apparatus and gain stages used.

Next, method 500 of FIG. 5 includes an activity 566 of storing the locations of the first portions. In some examples, the locations of the portions of the first portions can be stored in storage device 116 (FIG. 1) or storage device 123 (FIG. 1).

Method 500 in FIG. 5 continues with an activity 567 of associating the first portions of the electrical signals with usage of the electrical power by electrical appliances. U.S. application Ser. No. 12/283,869 to Patel et al. and PCT Application No. PCT/US11/33992 to Patel et al., which describe noise detection systems, are incorporated herein by reference.

Figure 6:
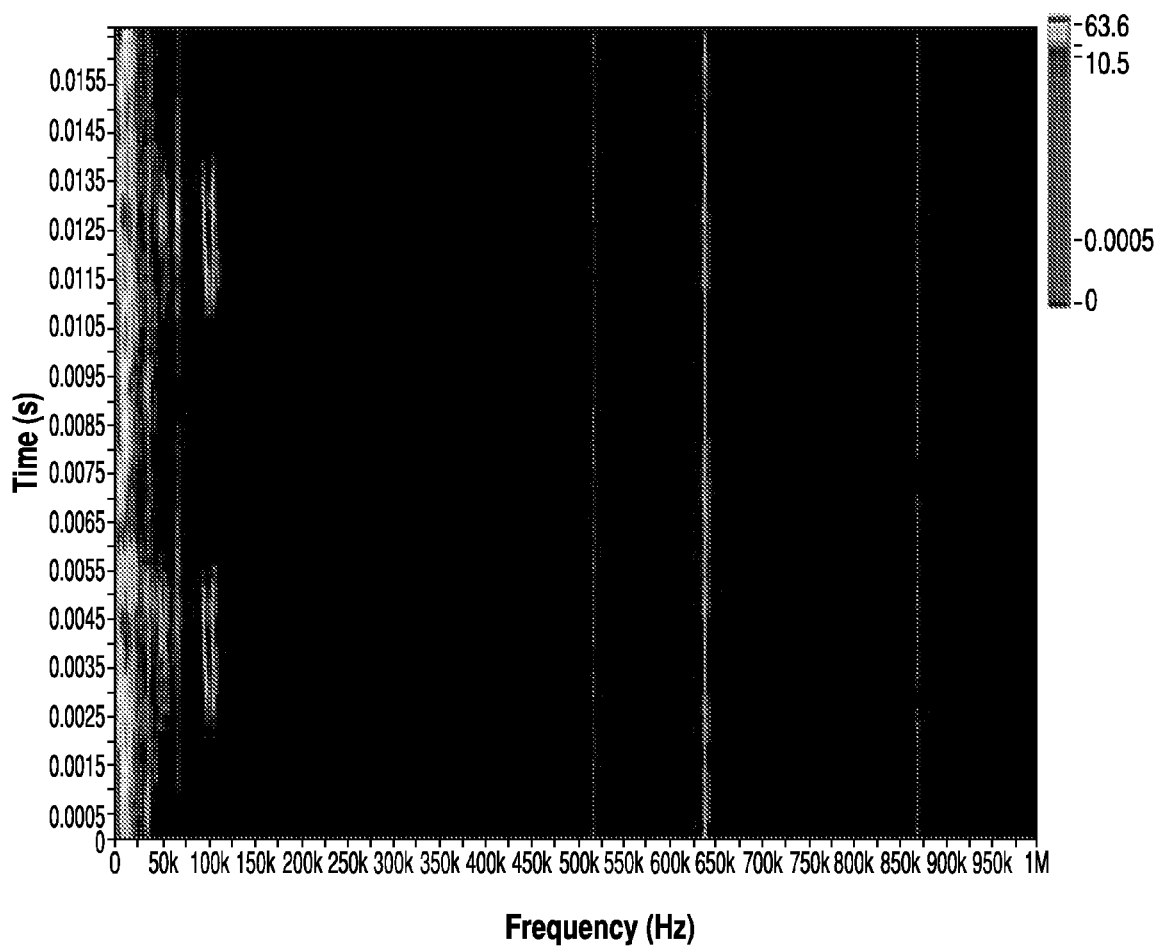
FIG. 6 illustrates a graph of the data from FIG. 4 after the method of FIG. 5 was applied to the data and after applying a short time Fourier transform.

FIG. 6 illustrates a graph 600 of a STFT plot showing the data from FIG. 4 after method 500 (FIG. 5) was applied to the data after the aforementioned algorithm is applied.

Figure 7:
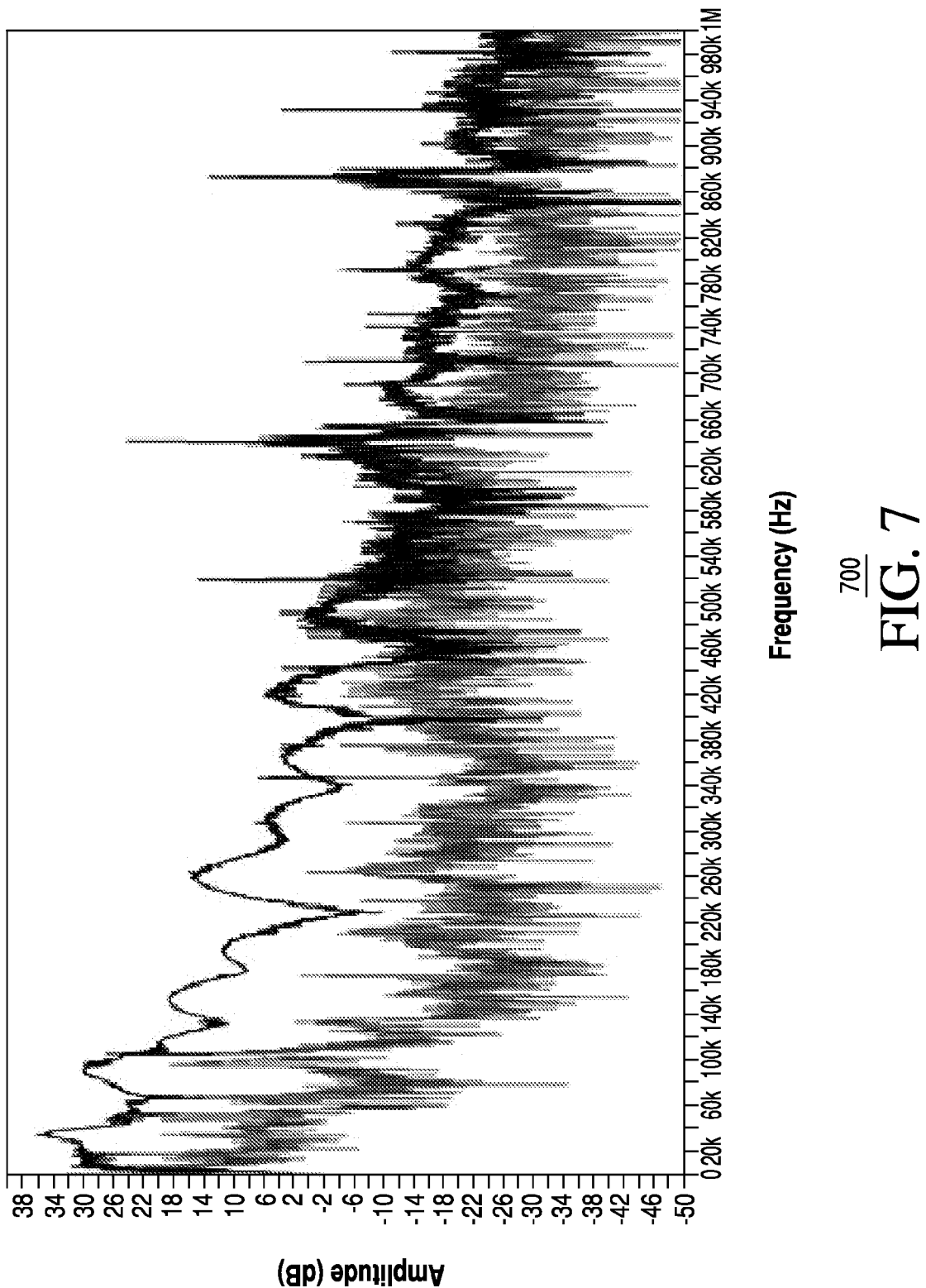
FIG. 7 illustrates a graph 700 of the data from FIG. 4 after the method of FIG. 5 was applied to the data and after applying a fast Fourier transform.
Figure 8:
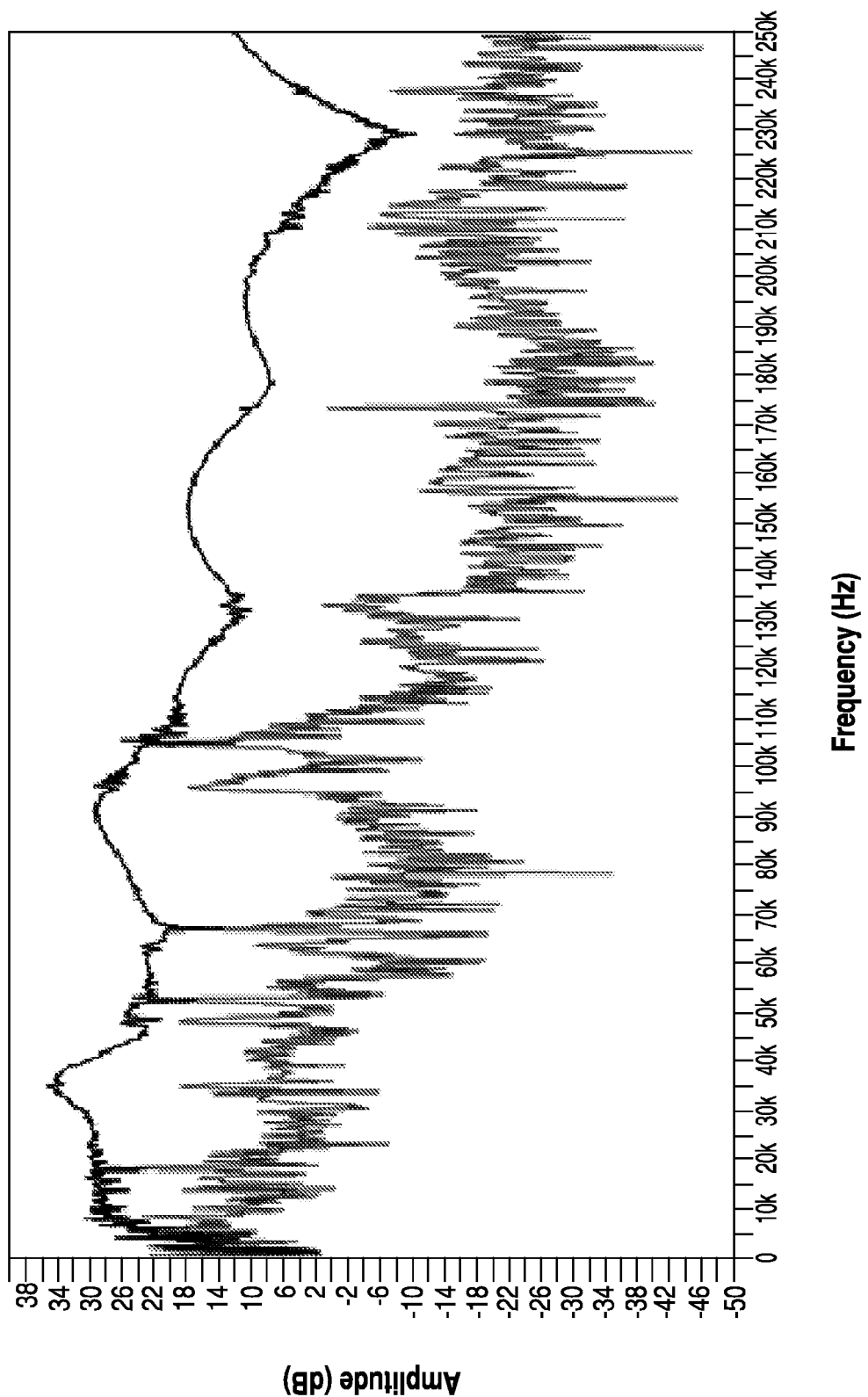
FIG. 8 illustrate a graph 800 of the zero to 250 kHz section of FIG. 7.

FIG. 7 illustrates a graph 700 showing a simple 8192 point FFT taken on the same data as FIG. 4 before and after method 500 (FIG. 5) was applied. The lighter trace in FIG. 8 shows the FFT of the original data. The darker trace in FIG. 8 show the FFT applied to data with the transients removed. FIG. 8 illustrates a graph 800 of the zero to 250 kHz section of FIG. 7. FIG. 8 illustrates the significant SNR improvement to the desired signals from the switch mode power supplies.

In some examples, the processing module can remove transients/spikes/glitches using digital signal processing where: (a) the transient/glitch/spike is identified using statistical metrics where comparing either the desired signal metrics against each point in the data set. The desired signal portion can be computed over the full data set or a predetermined portion of the data set; and/or (b) once the transient/spike/glitch is identified, the transient/spike/glitch is masked out using one of a number of masking techniques. In some examples, the statistical metrics of the desired signal is then used to adjust a variable gains stage to better utilize the dynamic range of an ADC.

In some examples, the embodiments described herein can be used for digital spectrum analyzers and any other device that performs Fourier transforms on waveforms where transient/glitches/spike distort the computed spectrum. The embodiments described here can also be used to with electrical device or any other product that would removes the noise of electrical devices (e.g., dimmers) from signals measured on the AC power line. The system and methods described herein can also be used in headphones to selectively mask out sudden sounds like gunshots etc and in night vision goggles to selectively mask sudden bright lights or possibly strobe lights.

In some examples, observed noise signal can be correlated to a change in current or power factor for de-noising the spectrogram. This correlation increases the ability to remove signals that are not of interest and come from external sources and allowing the algorithms to narrow the region of interest. The observation is that certain switch mode power supplies employ a variable frequency or pulsed frequency internal switcher. For these power supplies, the center frequency or the pulse rate is related to amount of current the load is pulling. By correlating the observed change in the current to the change in the HF noise, it is possible to isolate the area of interest in the HF spectrum. This provides a couple important features for the disaggregation algorithm. First, it allows the algorithm to effective reduce the noise of the spectrum by allowing it to focus on a smaller region. Second, over time this can be used to potentially label certain noise sources as 'external' and not a contributing load in the home. Even in the case of a fixed frequency power supply, the appearance of HF noise should be associated with a change in current. The lack of this can indicate that the HF source may be coupling from a neighboring home, a radio station, etc. This correlation allows us to ignore these signals from further processing. In some examples, the methods and activities described herein can help some process by allowing them to operated by seeing high frequency continuous noise event in the presence of dimmers, which can prevent these other processes from properly working.

In the same or different examples, long term HF noise can be used to fingerprint the entire home to detect if the sensor has been moved to a different location or a different home or even if the noise floor dramatically changes. It is important to know that the sensor has moved when using features that may change based on sensor placement (i.e., power line transfer function). This will allow the machine learning algorithms to deemphasize those features or restart the learning process. In other words, this would provide feedback to the algorithms that there has been a major change in the overall observed noise. It may be necessary to know when the sampling hardware has been plugged into a different outlet. This can be determined by taking continuous snap shots of the homes HF noise spectrum. From this spectrum, the top N peaks and their relative and absolute amplitudes can be extracted over a set period of time. If the sampling module were to be moved to a different location, the amplitudes of these peaks would change or even disappear. Using the method from above, we can use the peak that do not belong to an appliance in the home as the observed peaks of interest, especially if they are always apparent. This technique does not just apply to moving the sampling hardware, but also the addition of a noisy appliance or a modification to the home's power infrastructure.

Figure 9:
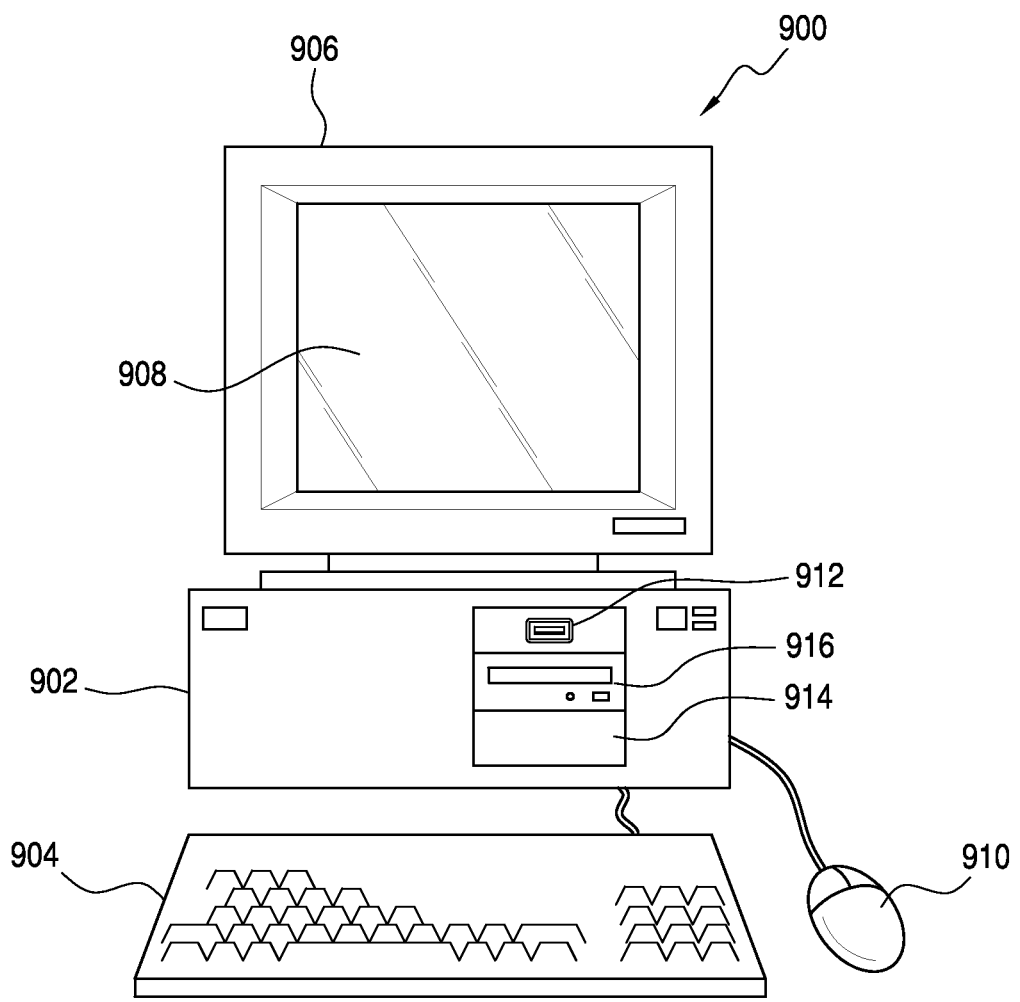
FIG. 9 illustrates a computer that is suitable for implementing an embodiment of system of FIG. 1.
Figure 10:
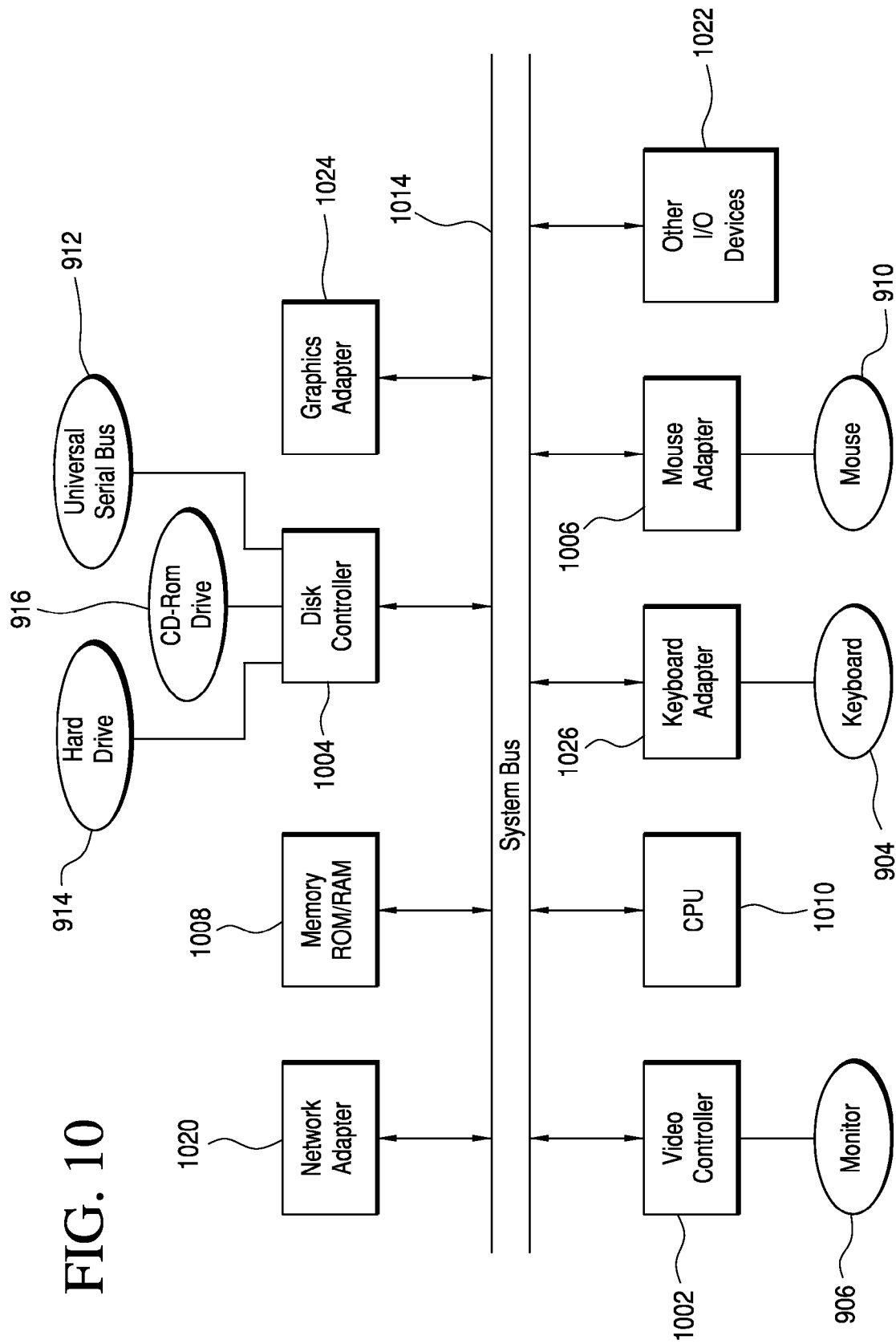
FIG. 10 illustrates a representative block diagram of an example of the elements included in the circuit boards inside chassis of the computer of FIG. 9.

FIG. 9 illustrates a computer 900 that is suitable for implementing an embodiment of at least a portion of computer system described above. Computer 900 includes a chassis 902 containing one or more circuit boards (not shown), a USB (universal serial bus) port 912, a Compact Disc Read-Only Memory (CD-ROM) and/or Digital Video Disc (DVD) drive 916, and a hard drive 914. A representative block diagram of the elements included on the circuit boards inside chassis 902 is shown in FIG. 10. A central processing unit (CPU) 1010 in FIG. 10 is coupled to a system bus 1014 in FIG. 10. In various embodiments, the architecture of CPU 1010 can be compliant with any of a variety of commercially distributed architecture families.

System bus 1014 also is coupled to memory 1008 that includes both read only memory (ROM) and random access memory (RAM). Non-volatile portions of memory 1008 or the ROM can be encoded with a boot code sequence suitable for restoring computer 900 (FIG. 9) to a functional state after a system reset. In addition, memory 1008 can include microcode such as a Basic Input-Output System (BIOS).

In the depicted embodiment of FIG. 10, various I/O devices such as a disk controller 1004, a graphics adapter 1024, a video controller 1002, a keyboard adapter 1026, a mouse adapter 1006, a network adapter 1020, and other I/O devices 1022 can be coupled to system bus 1014. Keyboard adapter 1026 and mouse adapter 1006 are coupled to a keyboard 904 (FIGS. 9 and 10) and a mouse 910 (FIGS. 1 and 10), respectively, of computer 900 (FIG. 9). While graphics adapter 1024 and video controller 1002 are indicated as distinct units in FIG. 10, video controller 1002 can be integrated into graphics adapter 1024, or vice versa in other embodiments. Video controller 1002 is suitable for refreshing a monitor 906 (FIGS. 9 and 10) to display images on a screen 908 (FIG. 9) of computer 900 (FIG. 9). Disk controller 1004 can control hard drive 914 (FIGS. 9 and 10), floppy disc drive 912 (FIGS. 9 and 10), and CD-ROM or DVD drive 916 (FIGS. 9 and 10). In other embodiments, distinct units can be used to control each of these devices separately.

Network adapters 1020 can be coupled to one or more antennas. In some embodiments, network adapter 1020 is part of a WNIC (wireless network interface controller) card (not shown) plugged or coupled to an expansion port (not shown) in computer 900. In other embodiments, the WNIC card can be a wireless network card built into internal computer 900. A wireless network adapter can be built into internal client computer 900 by having wireless Ethernet capabilities integrated into the motherboard chipset (not shown), or implemented via a dedicated wireless Ethernet chip (not shown), connected through the PCI (peripheral component interconnector) or a PCI express bus. In other embodiments, network adapter 1020 can be a wired network adapter.

Although many other components of computer 900 (FIG. 9) are not shown, such components and their interconnection are well known to those of ordinary skill in the art. Accordingly, further details concerning the construction and composition of computer 900 and the circuit boards inside chassis 902 (FIG. 9) need not be discussed herein.

When computer 900 in FIG. 9 is running, program instructions stored on stored on a USB drive in USB port 912, on a CD-ROM or DVD in CD-ROM and/or DVD drive 916, on hard drive 914, or in memory 1008 (FIG. 10) are executed by CPU 1010 (FIG. 10). A portion of the program instructions, stored on these devices, can be suitable for carrying out the methods as previously described.

As used herein, "processor" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions.

Although the invention has been described with reference to specific embodiments, it will be understood by those skilled in the art that various changes may be made without departing from the spirit or scope of the invention. Accordingly, the disclosure of embodiments of the invention is intended to be illustrative of the scope of the invention and is not intended to be limiting. It is intended that the scope of the invention shall be limited only to the extent required by the appended claims. For example, to one of ordinary skill in the art, it will be readily apparent that activities 561-567 may be comprised of many different activities, procedures and be performed by many different modules, in many different orders that any element of FIG. 1 may be modified and that the foregoing discussion of certain of these embodiments does not necessarily represent a complete description of all possible embodiments.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A method of isolating low amplitude signals in one or more electrical signals, the method comprising:
    using a data acquisition device to acquire one or more electrical signals, the one or more electrical signals comprise one or more transient signals and one or more first signals, amplitudes of the one or more first signals are less than amplitudes of the one or more transient signals, and the data acquisition device is configured to acquire the one or more electrical signals from at least one electrical outlet as one or more analog signals and convert the one or more analog signals to one or more digital signals such that the one or more electrical signals comprise the one or more digital signals;
    using a first processor to compute one or more first parameters related to the one or more electrical signals, wherein using the first processor to compute the one or more first parameters comprises:
        determining a median amplitude of the one or more electrical signals; and
        determining a median slope of the one or more electrical signals;
    using the first processor to determine one or more first portions of the one or more electrical signals that comprise the one or more transient signals, wherein determining the one or more first portions comprises:
        using the first processor to determine the one or more first portions of the one or more electrical signals where at least one of the following is true:
            an amplitude of the one or more first portions of the one or more electrical signals is greater than the median amplitude of the one or more electrical signals by a first predetermined amount; or
            a slope of the one or more first portions of the one or more electrical signals is greater than the median slope of the one or more electrical signals by a second predetermined amount;
    using the first processor to create one or more output signals; and
    adjusting a gain of the data acquisition device based upon one or more second parameters of the one or more output signals.

2. The method of claim 1, further comprising:
    using the first processor to compute the one or more second parameters related to the one or more output signals, wherein using the first processor to compute the one or more second parameters comprises:
        determining a median amplitude of the one or more output signals;
    wherein the one or more second parameters comprise the median amplitude of the one or more output signals.

3. The method of claim 2, wherein:
    adjusting the gain of the data acquisition device comprises:
        adjusting the gain of the data acquisition device such that the median amplitude of the one or more output signals is a predetermined percentage of a predetermined maximum gain range of the data acquisition device.

4. The method of claim 1, wherein:
    using the first processor to create the one or more output signals comprises:
        using the first processor to selectively mask the one or more first portions of the one or more electrical signals to create the one or more output signals, comprising:
            using the first processor to apply a linear interpolation technique to selectively mask the one or more first portions of the one or more electrical signals.

5. The method of claim 1, wherein:
    using the first processor to create the one or more output signals comprises:
        using the first processor to selectively mask the one or more first portions of the one or more electrical signals to create the one or more output signals, comprising:
            using the first processor to apply an inverted window function to selectively mask the one or more first portions of the one or more electrical signals.

6. The method of claim 1, further comprising:
    storing one or more locations of the one or more first portions of the one or more electrical signals.

7. The method of claim 1, further comprising:
    associating the one or more first portions of the one or more electrical signals with usage of electrical power by one or more first electrical appliances.

8. The method of claim 1, wherein:
    the one or more transient signals are caused by actuation of one or more first electrical appliances.

9. The method of claim 1, wherein:
    the first predetermined amount is scaled as a function of the one or more second parameters of the one or more output signals; and
    the second predetermined amount is scaled as a function of the one or more second parameters of the one or more output signals.

10. A signal processing device configured to isolate low amplitude signals in one or more electrical signals, the signal processing device comprising a first processor, the signal processing device comprising:
    a data acquisition apparatus configured to acquire one or more electrical signals, the one or more electrical signals comprise one or more transient signals and one or more first signals, amplitudes of the one or more first signals are less than amplitudes of the one or more transient signals, and the data acquisition apparatus is configured to acquire the one or more electrical signals from at least one electrical outlet as one or more analog signals and convert the one or more analog signals to one or more digital signals such that the one or more electrical signals comprise the one or more digital signals;
    a processing module configured to run on a first processor to (a) calculate a median amplitude of the one or more electrical signals and (b) calculate a median slope of the one or more electrical signals;
    a determination module configured to run on the first processor and further configured to determine one or more first portions of the one or more electrical signals that comprise the one or more transient signals, the determination module is further configured to determine one or more first portions of the one or more electrical signals where at least one of the following is true:
an amplitude of the one or more first portions of the one or more electrical signals is greater than the median amplitude of the one or more electrical signals by a first predetermined amount; or
a slope of the one or more first portions of the one or more electrical signals is greater than the median slope of the one or more electrical signals by a second predetermined amount; and
a masking module configured to run on the first processor and further configured to create one or more output signals; and
an adjustment module configured to adjust a gain of the data acquisition apparatus based upon one or more second parameters of the one or more output signals.

11. The signal processing device of claim 10, wherein:
the determination module is further configured to determine a median amplitude of the one or more output signals.

12. The signal processing device of claim 11, wherein:
the adjustment module is further configured to adjust the gain of the data acquisition apparatus such that the median amplitude of the one or more first portions of the one or more electrical signals is a predetermined percentage of the maximum gain range of the data acquisition apparatus.

13. The signal processing device of claim 10, wherein:
the masking module is further configured to selectively mask the one or more first portions of the one or more electrical signals to create the one or more output signals and to use the first processor to apply a linear interpolation technique to selectively mask the one or more first portions of the one or more electrical signals.

14. The signal processing device of claim 10, wherein:
the masking module is further configured to selectively mask the one or more first portions of the one or more electrical signals to create the one or more output signals and to apply an inverted window function to selectively mask the one or more first portions of the one or more electrical signals.

15. The signal processing device of claim 10, further comprising:
a storage module configured to store one or more locations of the one or more first portions of the one or more electrical signals.

16. The signal processing device of claim 10, further comprising:
an association module configured to associate the one or more first portions of the one or more electrical signals with usage of electrical power by one or more first electrical appliances.

17. The signal processing device of claim 10, wherein:
the one or more transient signals are caused by actuation of one or more first electrical appliances.

18. The signal processing device of claim 10, wherein:
the first predetermined amount is scaled as a function of the one or more second parameters of the one or more output signals; and
the second predetermined amount is scaled as a function of the one or more second parameters of the one or more output signals.

19. The signal processing device of claim 10, wherein:
the data acquisition apparatus comprises:
one or more filters;
an analog to digital converter; and
at least one digital signal processor; and
the first processor comprises at least one digital signal processor.

20. A method of isolating low amplitude signals in one or more electrical signals, the method comprising:
using a data acquisition device to acquire one or more electrical signals, the one or more electrical signals comprise one or more transient signals and one or more first signals, amplitudes of the one or more first signals are less than amplitudes of the one or more transient signals, and the data acquisition device is configured to acquire the one or more electrical signals from at least one electrical outlet as one or more analog signals and convert the one or more analog signals to one or more digital signals such that the one or more electrical signals comprise the one or more digital signals;
using a first processor to compute one or more first parameters related to the one or more electrical signals, wherein using the first processor to compute the one or more first parameters comprises:
determining a median amplitude of the one or more electrical signals; and
determining a median slope of the one or more electrical signals;
using the first processor to determine one or more first portions of the one or more electrical signals that comprise the one or more transient signals, wherein determining the one or more first portions comprises:
using the first processor to determine the one or more first portions of the one or more electrical signals where at least one of the following is true:
an amplitude of the one or more first portions of the one or more electrical signals is greater than the median amplitude of the one or more electrical signals by a first predetermined amount; or
a slope of the one or more first portions of the one or more electrical signals is greater than the median slope of the one or more electrical signals by a second predetermined amount; and
using the first processor to selectively mask the one or more first portions of the one or more electrical signals to create one or more output signals; and
adjusting a gain of the data acquisition device based upon one or more second parameters of the one or more output signals, wherein adjusting the gain comprises:
determining a median amplitude of the one or more output signals; and
adjusting the gain by a predetermined amount related to the median amplitude of the one or more output signals.

* * * * *